(12) United States Patent
Conlan et al.

(10) Patent No.: US 12,017,365 B2
(45) Date of Patent: Jun. 25, 2024

(54) SAFETY ARCHITECTURE FOR AN AUTOMATED WORK CELL

(71) Applicant: The Boeing Company, Chicago, IL (US)

(72) Inventors: Brian R. Conlan, Seattle, WA (US); Gavin Lloyd Smith, Edmonds, WA (US); Christopher J. Wheaton, Mukilteo, WA (US); Dan D. Day, Seattle, WA (US); Clayton Lynn Munk, Rockland, ID (US)

(73) Assignee: The Boeing Company, Chicago, IL (US)

( * ) Notice: Subject to any disclaimer, the term of this patent is extended or adjusted under 35 U.S.C. 154(b) by 387 days.

(21) Appl. No.: 17/501,649

(22) Filed: Oct. 14, 2021

(65) Prior Publication Data

US 2022/0118620 A1    Apr. 21, 2022

Related U.S. Application Data

(60) Provisional application No. 63/094,019, filed on Oct. 20, 2020.

(51) Int. Cl.
*B25J 9/16*       (2006.01)
*B25J 15/04*      (2006.01)
*B25J 19/00*      (2006.01)

(52) U.S. Cl.
CPC .............. *B25J 9/1676* (2013.01); *B25J 15/04* (2013.01); *B25J 19/0066* (2013.01)

(58) Field of Classification Search
CPC ........ B25J 9/1676; B25J 9/0084; B25J 15/04; B25J 19/0066; B25J 21/00; B25J 19/06; F16P 3/08
See application file for complete search history.

(56) References Cited

U.S. PATENT DOCUMENTS

| | | | |
|---|---|---|---|
| 11,001,460 B2* | 5/2021 | Huber | B65B 59/04 |
| 2012/0119876 A1* | 5/2012 | Shah | F16P 3/10 256/73 |
| 2013/0245821 A1* | 9/2013 | Nakamura | B25J 9/1674 700/245 |
| 2015/0128719 A1* | 5/2015 | Kilibarda | B23K 11/3063 29/402.19 |

FOREIGN PATENT DOCUMENTS

| | | |
|---|---|---|
| CN | 205834636 U | 12/2016 |
| EP | 2639019 A1 | 9/2013 |
| JP | H03136790 A | 6/1991 |

* cited by examiner

*Primary Examiner* — Khoi H Tran
*Assistant Examiner* — Nhi Q Bui
(74) *Attorney, Agent, or Firm* — Quinn IP Law

(57) ABSTRACT

Safety architecture for an automated work cell provides a barrier separating a work cell area from an operator or personnel area. The safety architecture enables personnel to conduct routine interactions with nonfunctioning motion platforms or positioning machines located in the work cell area through openings in the barrier separating the personnel area from the work cell area while other motion platforms or positioning machines in the work cell area continues to function.

20 Claims, 12 Drawing Sheets

SAFETY ARCHITECTURE FOR AN AUTOMATED WORK CELL

CROSS-REFERENCE TO RELATED APPLICATIONS

This application claims priority to U.S. App. No. 63/094,019 filed Oct. 20, 2020, which is entitled "SAFETY ARCHITECTURE FOR AN AUTOMATED WORK CELL" and which is incorporated herein by reference.

FIELD

This disclosure pertains to safety architecture for an automated, robotic work cell that enables safe operator interfaces with motion platforms or positioning machines in the automated, work cell. More specifically, this disclosure pertains to safety architecture for an automated work cell that provides a barrier separating a work cell area from an operator or personnel area. The safety architecture enables personnel to conduct routine interactions with nonfunctioning motion platforms or positioning machines located in the work cell area through openings in the barrier separating the personnel area from the work cell area while other motion platforms or positioning machines in the work cell area continues to function.

BACKGROUND

In many automated, robotic manufacturing facilities that manufacture large structural components, for example an airplane component assembly, one or more automated motion platforms or positioning machines are employed in the manufacturing of the structural component. The motion platforms are controlled by a control system to manipulate end effectors on the motion platforms around the structural component being manufactured. The end effectors are operable to perform such tasks as drilling fastener holes at predetermined locations in the structural component, retrieving or vacuuming shavings of the material of the structural component produced by drilling the holes, inserting fasteners into the drilled holes and manipulating the fasteners in order to complete assembly process(es). The end effectors and the motion platforms are controlled by the control system to not only perform the manufacturing steps such as drilling holes, but are also controlled by the control system to move about a work cell area in which the structural component is located to perform tasks such as moving to a tool location to deposit a tool at the tool location that had been used by the end effector and replace that tool with a different tool, to move the end effector to a fastener location to obtain a fastener that is then moved by the motion platform and the end effector to a location of a fastener hole in the structural component where the fastener is inserted, to move the motion platform and the end effector to another location to obtain another tool to be used by the end effector to manipulate the fastener in order to complete the assembly process using the tool obtained, etc.

The movements of the motion platforms and the end effectors on the motion platforms in the work cell area during the manufacturing process of the structural component are controlled by the control system. The control system operates autonomously according to a computer program without input from personnel overseeing the manufacturer of the structural component by the automated motion platforms and their end effectors. The work cell area occupied by the structural component and the motion platforms and end effectors manufacturing the structural component is surrounded by a safety barrier that is there to prevent personnel from entering the work cell area while the control system is controlling the movements of the motion platforms and their end effectors in manufacturing the structural component. Should it be necessary for an operator or other personnel to enter the work cell area through the safety barrier for the purpose of replacing tools in a tool location area in the work cell area, removing shavings accumulated from drilling holes in the material of the structural component, replenishing fasteners that are being used in the manufacture of the structural component or for any other reason related to the manufacture of the structural component by the automated motion platforms and their end effectors, it is necessary that the entire manufacturing process being conducted by the motion platforms and their end effectors inside the barrier surrounding the work cell area be shut down for the safety of the operator passing through the barrier and entering the work cell area.

Any routine maintenance or repair needed for any of the automated motion platforms and their end effectors, and/or other automated equipment in the work cell area that requires an operator to access the work cell area through the safety barrier requires a complete shut down of all of the automated machinery in the work cell area to ensure the safety of the operator entering the work cell area. The operator must enter the work cell area through a safety lockout gated entry system of the safety barrier surrounding the work cell area. The operator must then perform the maintenance or repair activity needed to the automated machines in the work cell area while all of the automated machines in the work cell area remain shut down, whether an automated machine requires maintenance and repair or not. At the completion of the maintenance or repair activity performed by the operator, it is then necessary to conduct a full work cell area surveillance to ensure that the operator or any other personnel have exited the work cell area through the lockout gate of the barrier surrounding the work cell area to ensure safe operation integrity prior to the control system resuming production activity with the control system controlling the automated motion platforms and their end effectors and other automated equipment in the work cell area in the manufacturing of the structural component in the work cell area.

The above described need to shut down the operation of all of the automated motion platforms and other automated machines in the work cell area required for an operator or other personnel to enter the work cell area to perform routine maintenance or to repair a machine in the work cell area detracts significantly from the efficiency of the manufacturing operations taking place in the work cell area and significantly increases the time required for the manufacturing of the structural component in the work cell area.

SUMMARY

The safety architecture of this disclosure provides a barrier separating a robotic work cell area containing a multiple of automated, motion platforms or positioning machines from an operator or personnel area for personnel that maintain the motion platforms or positioning machines in the work cell area. The safety architecture enables an operator in the personnel area to conduct routine interactions with a nonfunctioning motion platform or positioning machine located in the work cell area through openings in the barrier, while other motion platforms or positioning machines in the work cell area continue to function. When personnel are accessing a nonfunctioning motion platform or positioning machine, access is granted such that a barrier is maintained at all times protecting personnel from the automation that continues to function on the work piece.

The barrier has several openings through the barrier. The openings provide the personnel in the personnel area with access to a nonfunctioning motion platform or positioning machine in the work cell area through the openings while other motion platforms or positioning machines in the work cell area are functioning. The access to the work cell area from the personnel area provided by the openings enable the operator to remain in the personnel area external to the work cell area while conducting manual and automated tool changes, loading and removing tool test coupons, recharging lubricant of an end effector on a nonfunctioning motion platform or positioning machine in the work cell area, completing an entire change out or a replacement of an end effector on a nonfunctioning motion platform or positioning machine in the work cell area, etc. through the openings provided in the barrier separating the personnel area from the work cell area while other motion platforms or positioning machines in the work cell area continue to function. Again, when personnel are accessing a nonfunctioning motion platform or positioning machine, access is granted such that a barrier is maintained at all times protecting personnel from the automation that continues to function on the work piece.

Panels are positioned over the openings in the barrier. The panels are movable between closed positions of the panels where the panels cover over the openings and opened positions of the panels where the panels are displaced from the openings.

A control system communicates with motion platforms or each positioning machine in the work cell area and with each of the panels. The control system is operable to lock a panel in the closed position in response to the control system sensing a functioning motion platform or positioning machine adjacent the opening covered by the panel. The control system is also operable to unlock the panel and enable the panel to be moved to the opened position of the panel in response to the control system moving a motion platform or positioning machine adjacent the opening covered by the panel and the control system controlling the motion platform or positioning machine to be nonfunctioning.

The safety architecture includes a first cart. The first cart is manually moveable over a floor surface of the work cell area and personnel area. A first cart panel of the panels is secured to the first cart. The first cart panel extends vertically upward from the first cart. The first cart has a surface that is configured for receiving and supporting an end effector received on the surface of the first cart from a motion platform or positioning machine in the work cell area. The first cart is manually moveable from the personnel area through a first opening of the openings through the barrier and into the work cell area to a position in the work cell area where an end effector can be positioned on the surface of the first cart by a motion platform or positioning machine. As the first cart is moved through the first opening, the first cart panel is moved to a closed position of the first cart panel over the first opening in response to the first cart being moved from the personnel area through the first opening and into the work cell area. With the first cart positioned in the work cell area, a motion platform or positioning machine can position an end effector needing replacement on the surface of the first cart and then disconnect from the end effector. With the end effector supported on the surface of the first cart having been disconnected from the motion platform or positioning machine, the first cart is moveable from the work cell area through the first opening through the barrier and into the personnel area to remove the end effector from the work cell area. As the first cart is moved from the work cell area through the first opening through the barrier and into the personnel area, the first cart panel is moved to an opened position of the first cart panel where the first cart panel is displaced from the first opening.

The safety architecture also includes a second cart. The second cart is also manually moveable. A second cart panel of the panels is secured to the second cart. The second cart panel extends vertically upward from the second cart. The second cart has a surface that is configured for receiving and supporting an end effector received by the second cart. The end effector could be a replacement end effector to replace a disconnected end effector removed from the work cell area such as that discussed above. The second cart is moveable from the personnel area through the first opening of the openings through the barrier and into the work cell area. As the second cart is moved from the personnel area through the first opening through the barrier and into the work cell area, the second cart panel is moved over the first opening to a closed position of the second cart panel where the second cart panel covers over the first opening. The second cart is also moveable from the work cell area through the first opening through the barrier and into the personnel area. As the second cart is moved from the work cell area through the first opening through the barrier and into the personnel area, the second cart panel is moved to an opened position of the second cart panel where the second cart panel is displaced from the first opening.

The control system is operable to communicate with the motion platforms or positioning machines in the work cell area and with the first cart panel on the first cart. The control system is operable to lock the first cart panel in the closed position of the first cart panel in the first opening through the barrier in response to the control system sensing a functioning motion platform or positioning machine adjacent the first opening through the barrier. The control system is operable to unlock the first cart panel enabling the first cart panel to be moved to the open position of the first cart panel in response to the control system controlling the motion platform or positioning machine moved adjacent the first opening to be nonfunctioning. The control system is operable to lock and unlock the second cart panel in the same manner as the first cart panel.

The first opening through the barrier has an upper portion and a lower portion. The first cart panel is a lower panel that is configured to cover over the lower portion of the first opening when the first cart panel is moved to the closed position of the first cart panel over the first opening. There is a first upper panel positioned over the upper portion of the first opening. The first upper panel is moveable between a closed position of the first upper panel where the first upper panel covers over the upper portion of the first opening, and an opened position of the first upper panel where the first upper panel is displaced from the upper portion of the first opening.

The control system is operable to communicate with the motion platforms or positioning machines in the work cell area and with the first upper panel. The control system is operable to lock the first upper panel in the closed position of the first upper panel over the upper portion of the first opening in response to the control system sensing a functioning motion platform or positioning machine having been moved adjacent to the upper portion of the first opening. The control system is operable to unlock the first upper panel in the closed position of the first upper panel over the upper portion of the first opening in response to the control system sensing the motion platform or positioning machine having been displaced from adjacent the upper portion of the first opening.

There is also a second opening through the barrier, for example a tooling opening. The tooling opening provides personnel in the personnel area access to a tool changing location in the work cell area through the tooling opening.

A second panel, for example a tooling panel is positioned over the tooling opening. The tooling panel is moveable between a closed position of the tooling panel where the tooling panel covers over the tooling opening and an opened position of the tooling panel where the tooling panel is displaced from the tooling opening.

The control system communicates with the motion platform or positioning machines in the work cell area and with the tooling panel. The control system is operable to lock the tooling panel in the closed position over the tooling opening in response to the control system sensing a functioning motion platform or positioning machine adjacent the tooling opening. The control system is also operable to unlock the tooling panel and enable the tooling panel to be moved to the opened position of the tooling panel in response to the control system sensing a nonfunctioning motion platform or positioning machine adjacent the tooling opening.

There is also a third opening through the barrier, for example a test opening. The test opening provides personnel in the personnel area access to a test coupon location in the work cell area through the test opening.

A third panel, for example is a test panel is positioned over the test opening. The test panel is moveable between a closed position of the test panel where the test panel covers over the test opening and an opened position of the test panel where the test panel is displaced from the test opening.

The control system communicates with the motion platforms or positioning machines in the work cell area and with the test panel. The control system is operable to lock the test panel in the closed position over the test opening in response to the control system sensing a functioning motion platform or positioning machine adjacent the test opening. The control system is also operable to unlock the test panel and enable the test panel to be moved to the opened position of the test panel in response to the control system sensing a nonfunctioning motion platform or positioning machine adjacent the test opening.

The features, functions and advantages that have been discussed can be achieved independently in various embodiments or may be combined in yet other embodiments, further details of which can be seen with reference to the following description and drawings.

BRIEF DESCRIPTION OF THE DRAWINGS

Further features of the safety architecture for an automated work cell and its method of operation are set forth in the following detailed description of the safety architecture and in the following drawing figures.

DETAILED DESCRIPTION

The safety architecture for an automated work cell of this disclosure eliminates the requirement for an automation cell operator or other personnel to enter an automated, work cell through a monitored gate in a safety barrier surrounding the work cell to conduct routine operations in the maintenance of motion platforms or positioning machines and their end effectors and other automated machines in the work cell. The operator remains in a personnel area external to the work cell area while conducting manual and automated tool changes, loading and removing tool test coupons, recharging lubricant of an end effector on a motion platform or positioning machine in the work cell area, completing an entire change-out or a replacement of an end effector on a nonfunctioning motion platform or positioning machine in the work cell area, etc. through openings provided in a barrier separating the personnel area from the work cell area while other motion platforms or positioning machines and other automated positioning machines in the work cell area continue to function. This results in the benefits of increased automation operator or personnel safety by reducing exposure of the personnel to functioning automated motion platforms or positioning machines and other automated machines in the work cell area, and reducing critical path machine down time by being able to stage and conduct routine maintenance activities in a more rapid fashion on an automated motion platform or positioning machine or other automated machine while the machine is nonfunctional and while other motion platforms or positioning machines and other automated machines in the work cell area continue to function.

Figure 1:
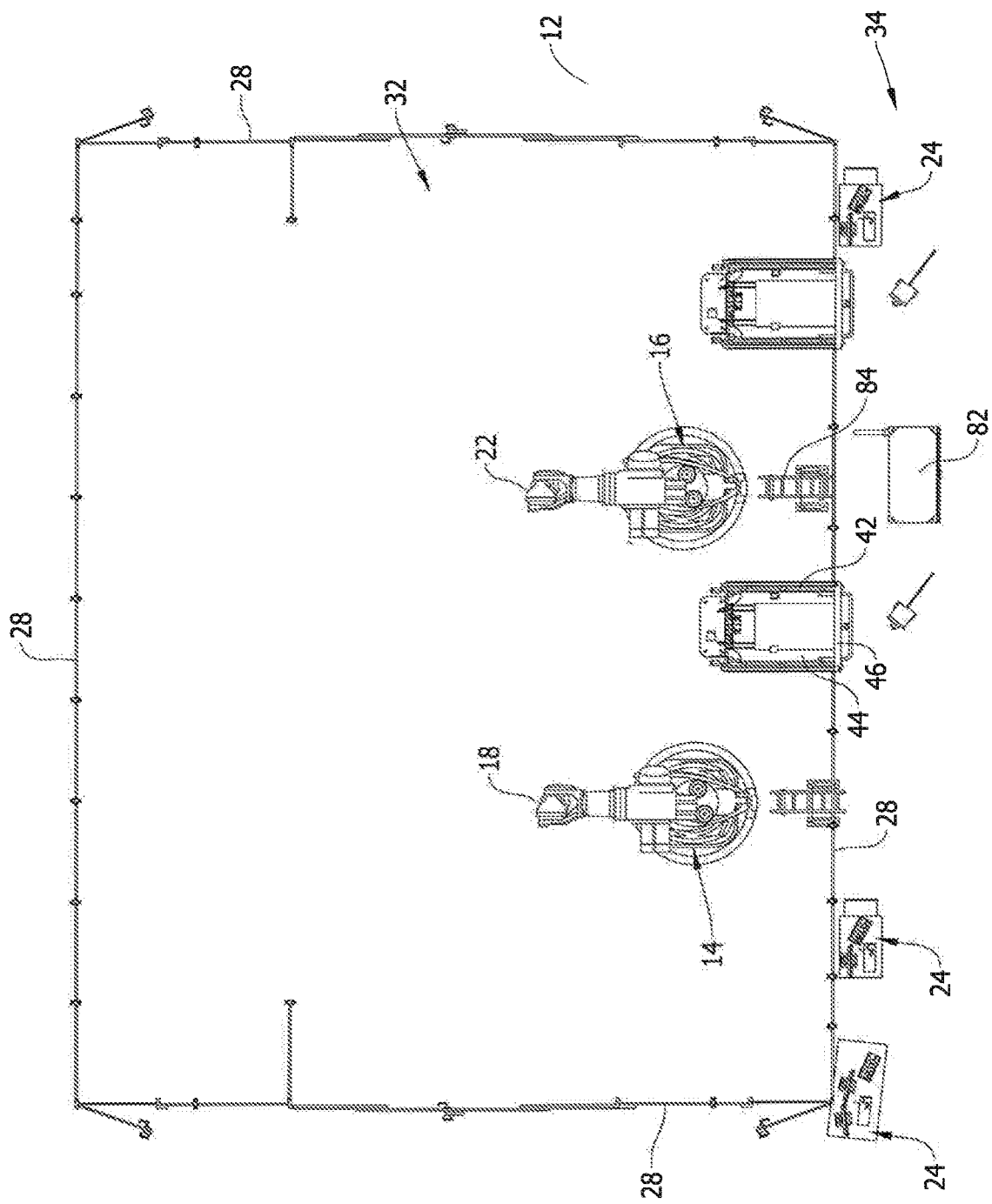
FIG. 1 is a representation of a plan view of the safety architecture for an automated work cell of this disclosure.
Figure 2:
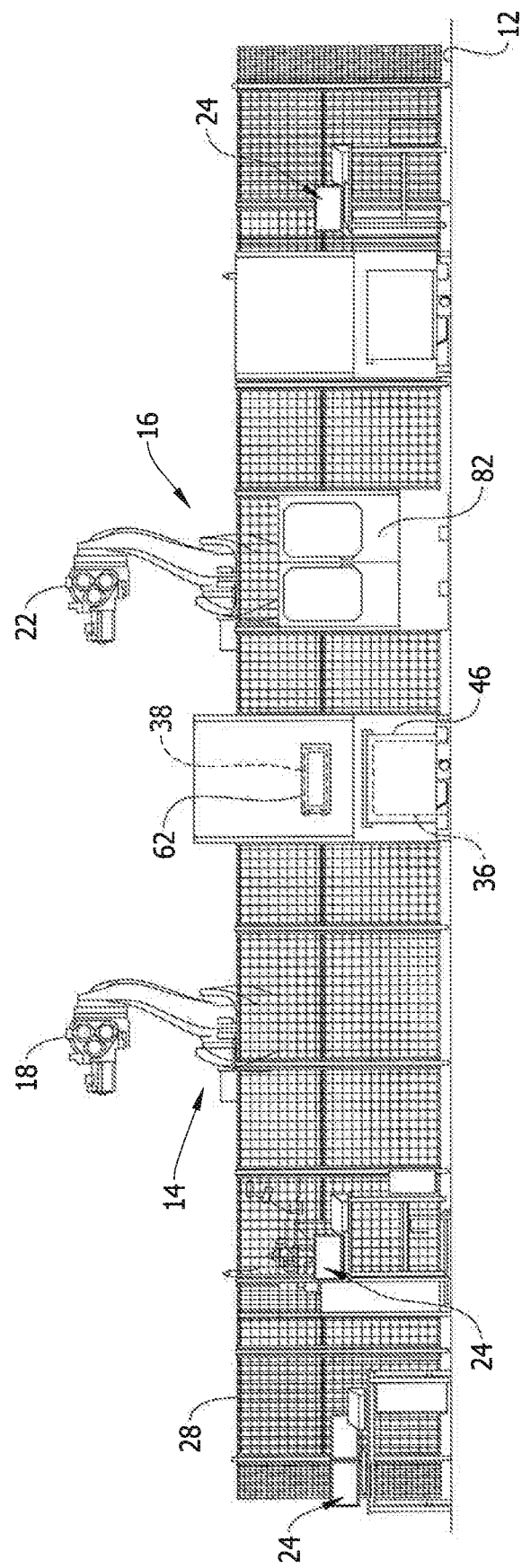
FIG. 2 is a representation of a front elevation view of the safety architecture represented in FIG. 1.
Figure 3:
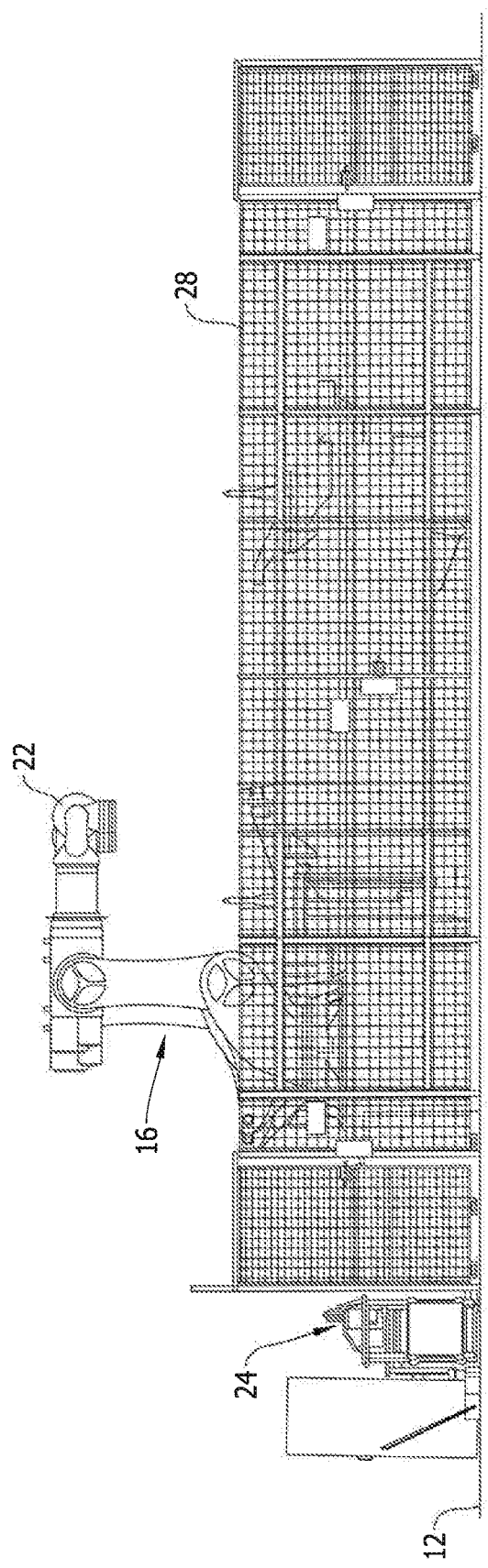
FIG. 3 is a representation of a right side elevation view of the safety architecture represented in FIG. 1, with the left side elevation view of the safety architecture being basically a mirror image of the right side elevation view.

Referring to FIG. 1, a floor surface 12 of a production facility is represented. There are a number of automated, machines positioned on the floor surface 12. The machines include a pair of automated, motion platforms or positioning machines 14, 16. The motion platforms or positioning machines 14, 16 have end effectors 18, 22(EE) at the ends of arms of the motion platforms or positioning machines 14, 16. The structure of the end effectors 18, 22 and the programming of the end effectors is determined to best suit the motion platforms or positioning machines 14, 16 to manufacture a structural component, for example an aircraft component assembly in response to command signals received by the motion platforms or positioning machines 14, 16 from a control system 24 that includes a human/machine interface (HMI). Although only two motion platforms or positioning machines 14, 16 and their respective end effectors 18, 22 are represented in FIGS. 1 and 2, the safety architecture of this disclosure could also be employed in controlling and maintaining the safety of more than two motion platforms or positioning machines and their associated end effectors. The end effectors 18, 22 could be provided with a variety of different types of tools that would be needed in the manufacture of a structural component, for example drills, cutting tools, grippers, sanders, screwdrivers, spray guns, welders, vacuum tips, etc. All of the automated motion platforms or positioning machines 14, 16 represented in FIG. 1 are described generally as positioning machines herein.

The safety architecture comprises a barrier 28 on the floor surface 12. The barrier 28 extends completely around the positioning machines 14, 16 on the floor surface 12. The barrier 28 is a metal mesh or wire screen type barrier that has a height dimension of approximately 6 feet. Other equivalent types of barriers could be employed. The barrier 28 extending around the positioning machines 14, 16 on the floor surface 12 separates a work cell area 38 of the floor surface 12 within the barrier 28 from an operator or personnel area 34 outside the barrier 28. The personnel area 34 is for personnel or operators that maintain the positioning machines 14, 16 in the work cell area 32.

The barrier 28 has several openings through a front section of the barrier. The openings provide the personnel in the personnel area 34 with access to an immobile, nonfunctioning positioning machine in the work cell area 32 through the openings, while other positioning machines in the work cell area are functioning. The access to the work cell area 32 from the personnel area 34 provided by the openings enable an operator or personnel to remain in the personnel area 34 external to the work cell area 32 while conducting manual and automated tool changes, loading and removing tool test coupons, recharging lubricant of an end effector on a nonfunctioning positioning machine in the work cell area 32, completing an entire change out or a replacement of an end effector on a nonfunctioning positioning machine in the work cell area 32, etc. This maintenance and/or repair is conducted through the openings provided in the barrier separating the personnel area 34 from the work cell area 32 while other positioning machines in the work cell area continue to function. When personnel are accessing a nonfunctioning positioning machine 14, 16, access is granted such that a barrier is maintained at all times protecting personnel from the automation that continues to function on the work piece.

The openings through the barrier 28 include a cart and end effector opening or a first opening 36 represented by dashed lines in FIG. 2. The first opening 36 is actually a lower portion 36 of the first opening, which also includes an upper portion 38 of the first opening. The lower portion of the first opening 36 has a rectangular configuration through the barrier 28. The lower portion of the first opening 36 extends to the bottom of the barrier 28 with the floor surface 12 defining the bottom of the lower portion of the first opening 36. The upper portion of the first opening 38 through the barrier 28 is represented by dashed lines 38 in FIG. 2.

Figure 4:
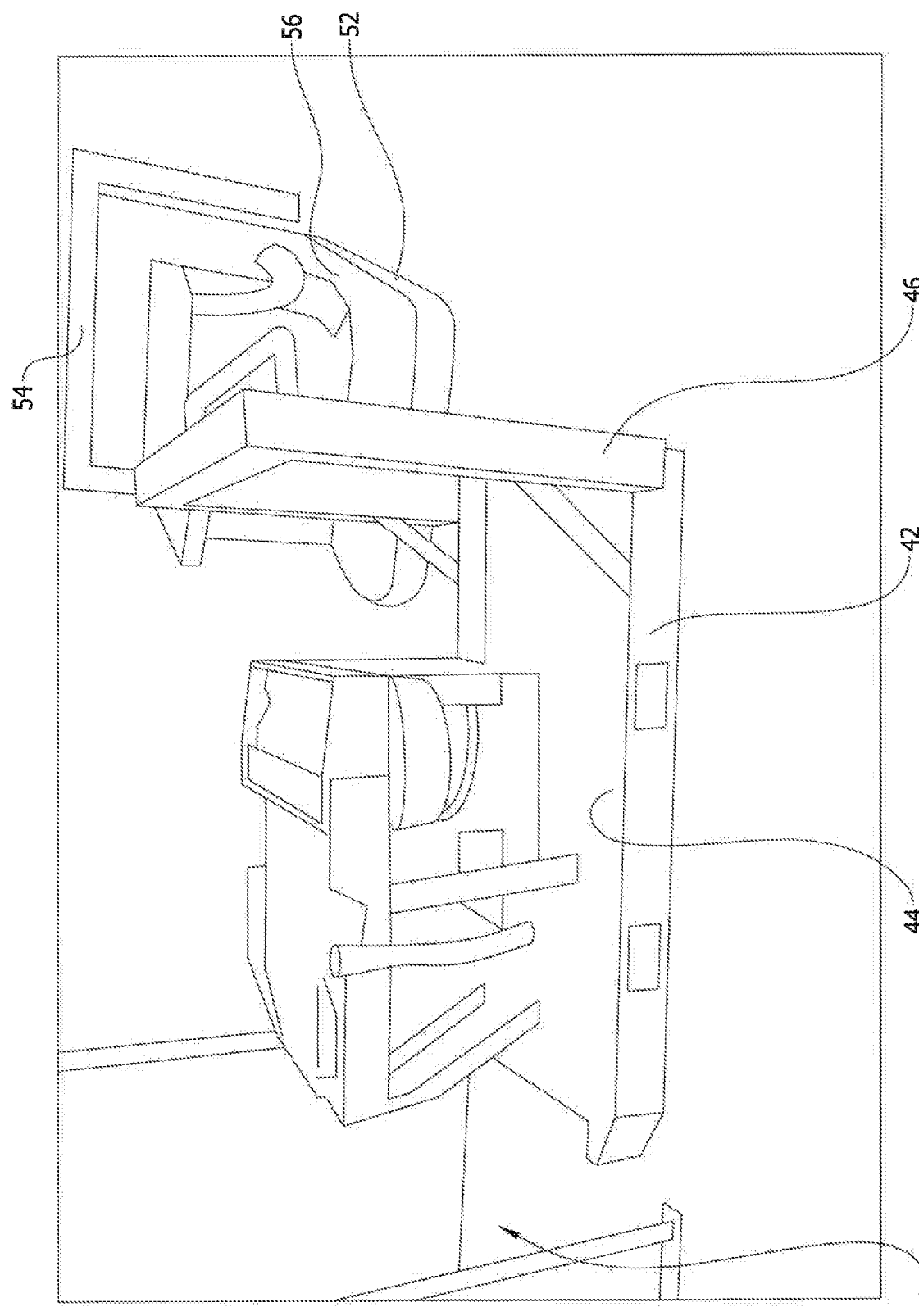
FIG. 4 is a representation of a perspective view of a first cart and a second cart of the safety architecture.
Figure 5:
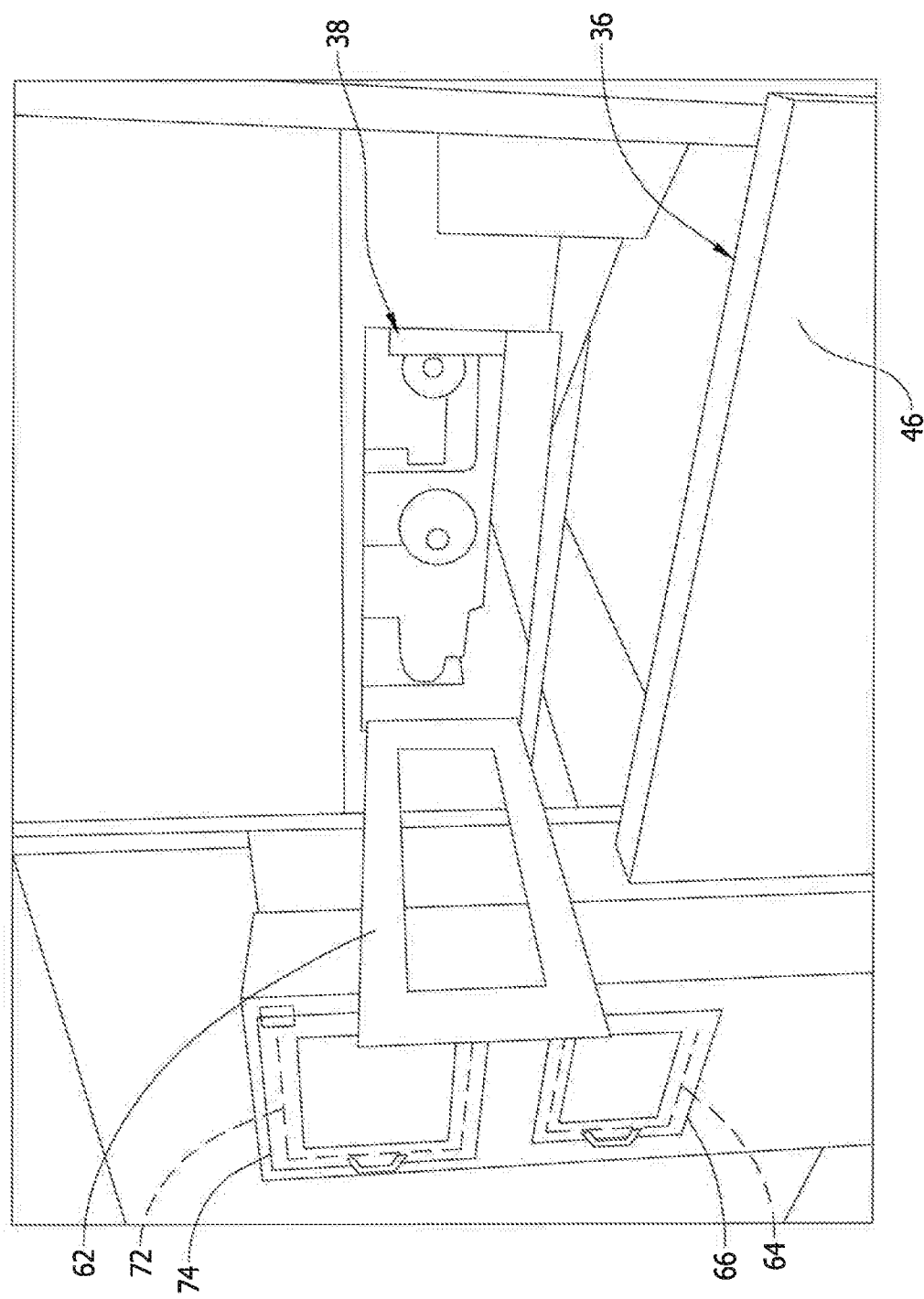
FIG. 5 is a representation of a perspective view of a lower portion of a first opening and an upper portion of a first opening in a barrier of the safety architecture.
Figure 6:
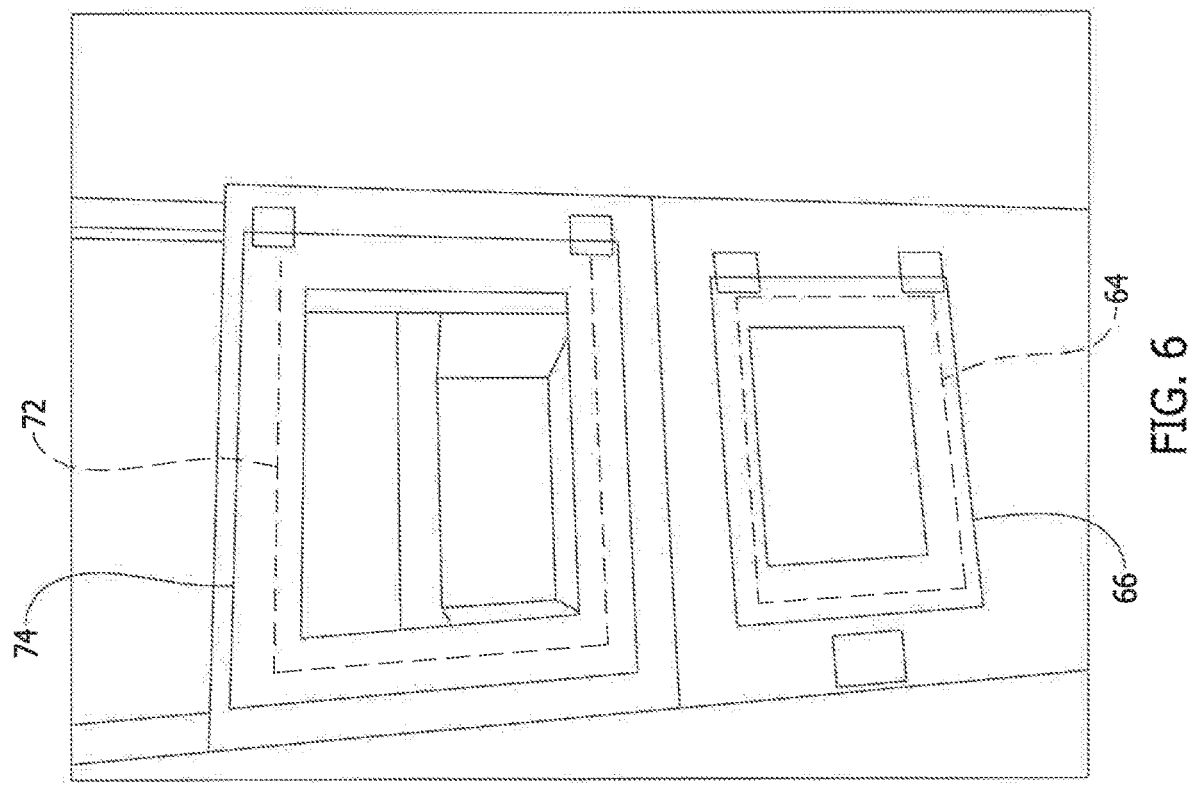
FIG. 6 is a representation of an elevation view of a second, tool opening and a third, test coupon opening in the barrier of the safety architecture.
Figure 7:
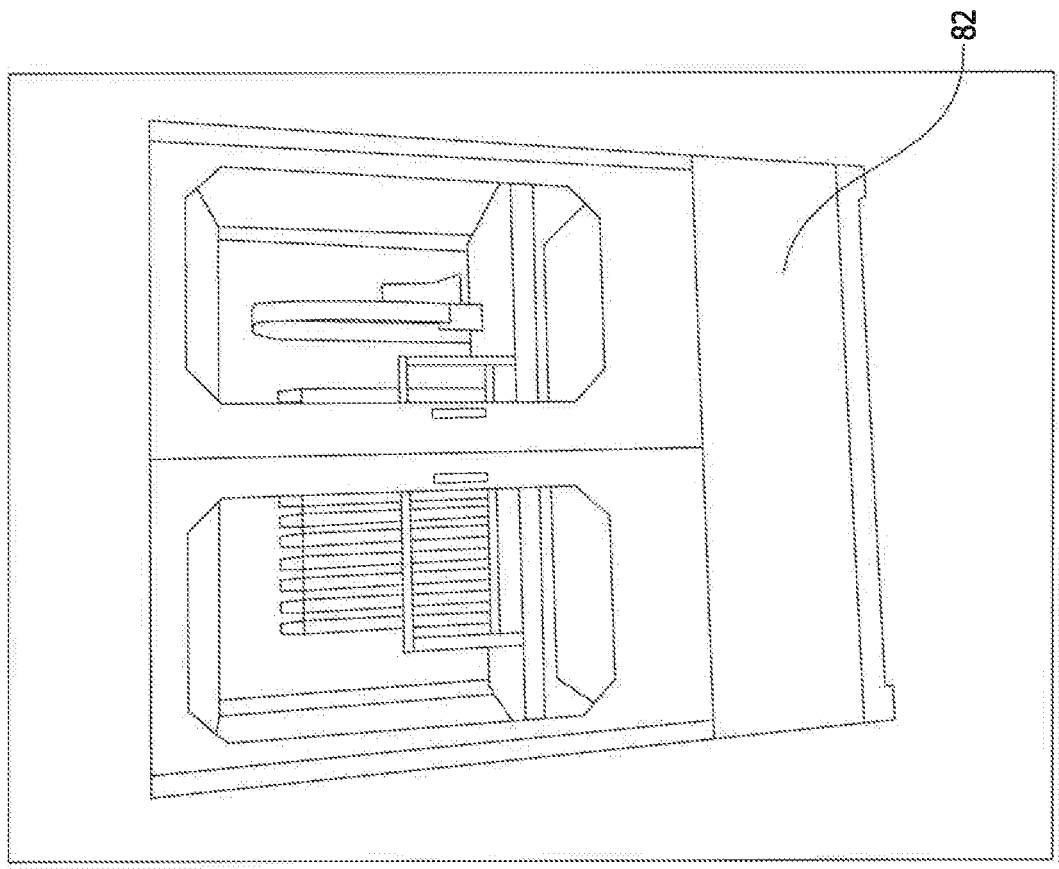
FIG. 7 is a representation of an elevation view of a fastener feed cabinet of the safety architecture.
Figure 8:
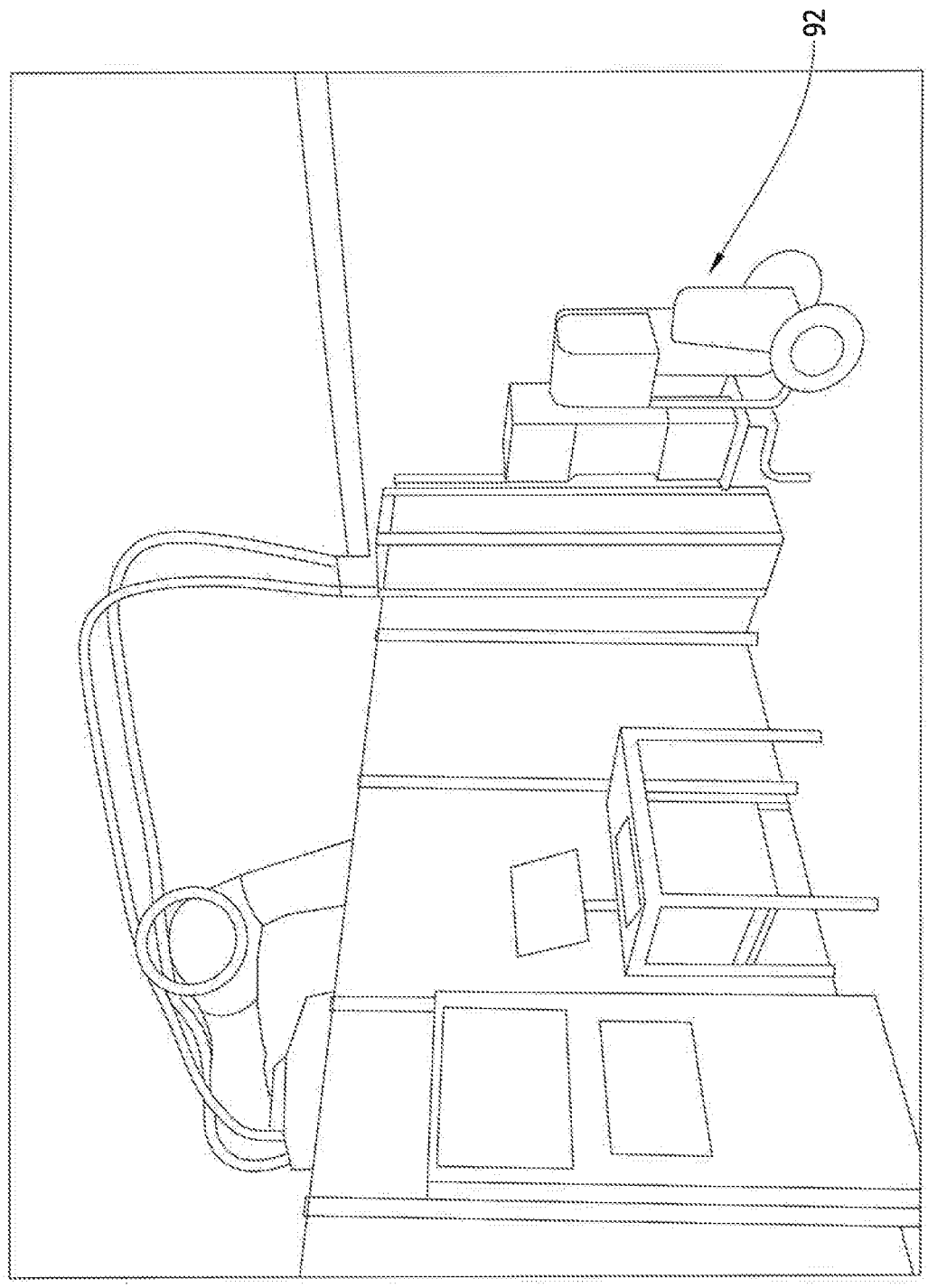
FIG. 8 is a representation of a perspective elevation view of a vacuum system and collection canister of the safety architecture.

The safety architecture includes a first cart 42. As represented in FIG. 4, the first cart has a base with a general rectangular configuration. There are multidirectional roller devices, for example castors or other equivalent types of roller devices mounted to the bottom of the first cart 42. The roller devices enable the first cart 42 to be manually moveable over the floor surface 12 in multiple directions. The first cart 42 also has a top surface 44 having means for receiving and supporting an end effector. For example means for receiving and supporting an end effector 18 needing replacement on the top surface that has been positioned by a positioning machine on the top surface 44 and disconnected from the positioning machine. As represented in FIG. 4, a first cart panel 46 is secured to the forward edge of the first cart 42. The first cart panel 46 extend vertically upward from the first cart 42.

The first cart 42 is manually moveable from the personnel area 34 through the lower portion of the first opening 36 in the barrier 28 and into the work cell area 32 to a position of the first cart 42 in the work cell area 32. With the first cart 42 positioned in the work cell area 32, an end effector can be positioned on the top surface 44 of the first cart 42 by a positioning machine or robot 14, 16. As the first cart 42 is moved through the lower portion of the first opening 36, the first cart panel 46 is moved to a closed position of the first cart panel 46 over the lower portion of the first opening 36. With the first cart 42 positioned in the work cell area 32, a positioning machine 14 can position an end effector 18 needing replacement on the top surface 44 of the first cart 42, and then disconnect from the end effector 18. With the end effector 18 supported on the top surface 44 of the first cart 42 having been disconnected from the positioning machine 14, the first cart is manually moveable from the work cell area 32 through the lower portion of the first opening 36 in the barrier 28 and into the personnel area 34 to remove the end effector 18 from the work cell area 32. As the first cart 42 is manually moved from the work cell area 32 through the lower portion of the first opening 36 in the barrier 28 and into the personnel area 34, the first cart panel 46 is moved to an opened position of the first cart panel 46 where the first cart panel 46 is displaced from the lower portion of the first opening 36. This leaves the lower portion of the first opening open and accessible.

The safety architecture also includes a second cart 52. The second cart 52 is basically a duplicate of the first cart 42. The second cart 52 is also manually moveable. A second cart panel 54 is secured to a forward edge of the second cart 52. The second cart panel 54 extends vertically upward from the forward edge of the second cart 52 and has a configuration that will close over the lower portion of the first opening 36 when positioned over the lower portion of the first opening. The second cart 52 also has a top surface 56 having means for receiving and supporting an end effector 22 received by the second cart 52. The end effector 22 could be a replacement end effector to replace a disconnected end effector 18 needing replacement removed from the work cell area 32 such as that discussed above. The second cart 52 is manually moveable from the personnel area 32 with the replacement end effector through the lower portion of the first opening 36 in the barrier 28 and into the work cell area 32 to a position where the positioning machine or robot 14 can connect to the replacement end effector. As the second cart 52 is moved from the personnel area 34 through the lower portion of the first opening 36 and into the work cell area 32, the second cart panel 54 is moved over the lower portion of the first opening 36 to a closed position of the second cart panel 54 where the second cart panel 54 covers over the lower portion of the first opening 36. The second cart 52 is also manually moveable without the replacement end effector from the work cell area 32 through the lower portion of the first opening 36 in the barrier 28 and into the personnel area 34. As the second cart 52 is moved from the work cell area 32 through the lower portion of the first opening 36 in the barrier 28 and into the personnel area 34, the second cart panel 54 is moved to an opened position of the second cart panel 54 where the second cart panel 54 is displaced from the lower portion of the first opening 36.

The control system 24 is operable to communicate with the positioning machines or motion platforms 14, 16 in the work cell area 32 and with the first cart panel 46 on the first cart 42 and the second cart panel 54 on the second cart 52. The control system 24 is operable to lock the first cart panel 46 in the closed position of the first cart panel 46 in the lower portion of the first opening 36 in the barrier 28 in response to the control system 24 sensing a mobile, functioning positioning machine or robot 14, 16 adjacent the lower portion of the first opening 36 in the barrier 28. The control system 24 is operable to unlock the first cart panel 46 enabling the first cart panel 46 to be moved to the opened position of the first cart panel 46 in response to the control system 24 controlling a positioning machine or robot 14, 16 to move to a position adjacent the lower portion of the first opening 36. With the positioning machine 14, 16 having been moved to a position adjacent the lower portion of the first opening 36, the control system then controls the positioning machine 14, 16 to be immobile and nonfunctioning. The control system 24 is operable to lock and unlock the second cart panel 54 in the same manner as the first cart panel 46.

There is a first upper panel 62, or a manual tool change panel (MTC) positioned over the upper portion of the first opening 38. The first upper panel 62 is moveable between a closed position of the first upper panel 62 where the first upper panel 62 covers over the upper portion of the first opening 38, and an opened position of the first upper panel 62 where the first upper panel 62 is displaced from the upper portion of the first opening 38. With the upper portion of the first opening 38 positioned directly above the lower portion of the first opening 36, there is sufficient area behind the lower portion of the first opening 36 and the upper portion of the first opening 38 to maneuver a positioning machine or robot 14, 16 supporting an end effector to the area behind the lower portion of the first opening 36 and the upper portion of the first opening 38, and position the end effector directly behind the first upper panel 62. With the control system 24 positioning the positioning machine or robot 14 and the attached end effector 18 behind the first upper panel 62, the control system 24 can control the positioning machine or robot 14 and end effector 18 to be immobile and nonfunctioning. The immobile and nonfunctioning end effector 18 then can be accessed by personnel from the personnel area 34 for servicing of the end effector 18.

The control system 24 is operable to communicate with the positioning machines 14, 16 in the work cell area 32 and with the first upper panel 62. The control system 24 is operable to lock the first upper panel 62 in the closed position of the first upper panel 62 over the upper portion of the first opening 38 in response to the control system 24 sensing a mobile, functioning positioning machine 14, 16 having been moved adjacent to the upper portion of the first opening 38. The control system 24 is operable to unlock the first upper panel 62 in the closed position of the first upper panel 62 over the upper portion of the first opening 38 in response to the control system 24 sensing the positioning machine 14, 16 adjacent the upper portion of the first opening 38 having been controlled by the control system 24 to be immobile and nonfunctioning.

There is also a second opening through the barrier 28. The second opening 64 is represented by dashed lines in FIG. 2. The second opening 64 is, for example, a tooling opening that enables personnel in the personnel area 34 to access a tool changing location behind the second opening 64 in the barrier 28 to position tools in the tool changing location in the work cell area 32 or replace tools from the tool changing location.

A second panel 66, for example, a tooling panel is positioned over the tooling opening 64. The tooling panel 66 is moveable between a closed position of the tooling panel where the tooling panel 66 covers over the tooling opening 64, and an opened position of the tooling panel 66 where the tooling panel is displaced from the tooling opening 64.

The control system 24 communicates with the positioning machines or motion platforms 14, 16 in the work cell area 32 and with the tooling panel 66. The control system 24 is operable to lock the tooling panel 66 in the closed position over the tooling opening 64 in response to the control system 24 sensing a mobile, functioning positioning machine 14, 16 adjacent the tooling opening 64. The control system 24 is also operable to unlock the tooling panel 66 and enable the tooling panel to be moved to the opened position of the tooling panel where the tooling panel 66 is displaced from the tooling opening 64 in response to the control system 24 sensing an immobile, nonfunctioning positioning machine adjacent the tooling opening 64.

A third opening 72, for example, a test coupon opening is provided in the barrier 28. As represented in FIG. 2, the third opening 72 is shown in dashed lines and is positioned just above the second, tooling opening 64. The third opening 72 or test coupon opening enables personnel in the personnel area 34 to access a test coupon holder positioned in the work cell area 32 just behind the test coupon opening 74 to supply material test coupons to the test coupon holder or remove used test coupons from the test coupon holder.

A third panel, for example, a test panel 74 is positioned over the test coupon opening 72. The test panel 74 is moveable between a closed position of the test panel where the test panel 74 covers over the test coupon opening 72, and an opened position of the test panel 74 where the test panel is displaced from the test coupon opening 72.

The control system 24 communicates with the positioning machines or motion platforms 14, 16 in the work cell area 32 and with the test panel 74. The control system 24 is operable to lock the test panel 74 in the closed position over the test coupon opening 72 in response to the control system 24 sensing a mobile, functioning positioning machine adjacent the test coupon opening 72. The control system 24 is also operable to unlock the test panel 74 and enable the test panel 74 to be moved to the opened position of the test panel 74 displaced from the test coupon opening 72 in response to the control system 24 sensing an immobile, nonfunctioning positioning machine adjacent the test opening 72.

There is a fastener feed cabinet 82 positioned in the personnel area 34 and separated from the work cell area 32 by the barrier 28. The fastener feed cabinet 82 communicates with the work cell area 32 by a fastener feed conveyor 84 that extends from the fastener feed cabinet 82 across the barrier 28 to the work cell area 32. The fastener feed cabinet 82 is controlled by the control system 24 to provide needed fasteners to the end effectors 18, 22 in the work cell area 32.

A vacuum system with a collection canister 92 is positioned in the personnel area 34 and is separated from the work cell area 32 by the barrier 28. The vacuum system and collection canister 92 communicate with the end effectors 18, 22 in the work cell area 32. The vacuum system and collection canister 92 are controlled by the control system 24 to vacuum material shavings produced by drilling holes in the structural component in the work cell area and collect the shavings in the vacuum system and collection canister 92. Positioning the vacuum system and collection canister 92 in the personnel area 32 and separated by the barrier 28 from the work cell area 32 provides personnel access to the canister to dispose of shavings without personnel entering the work cell area 32.

Figure 9:
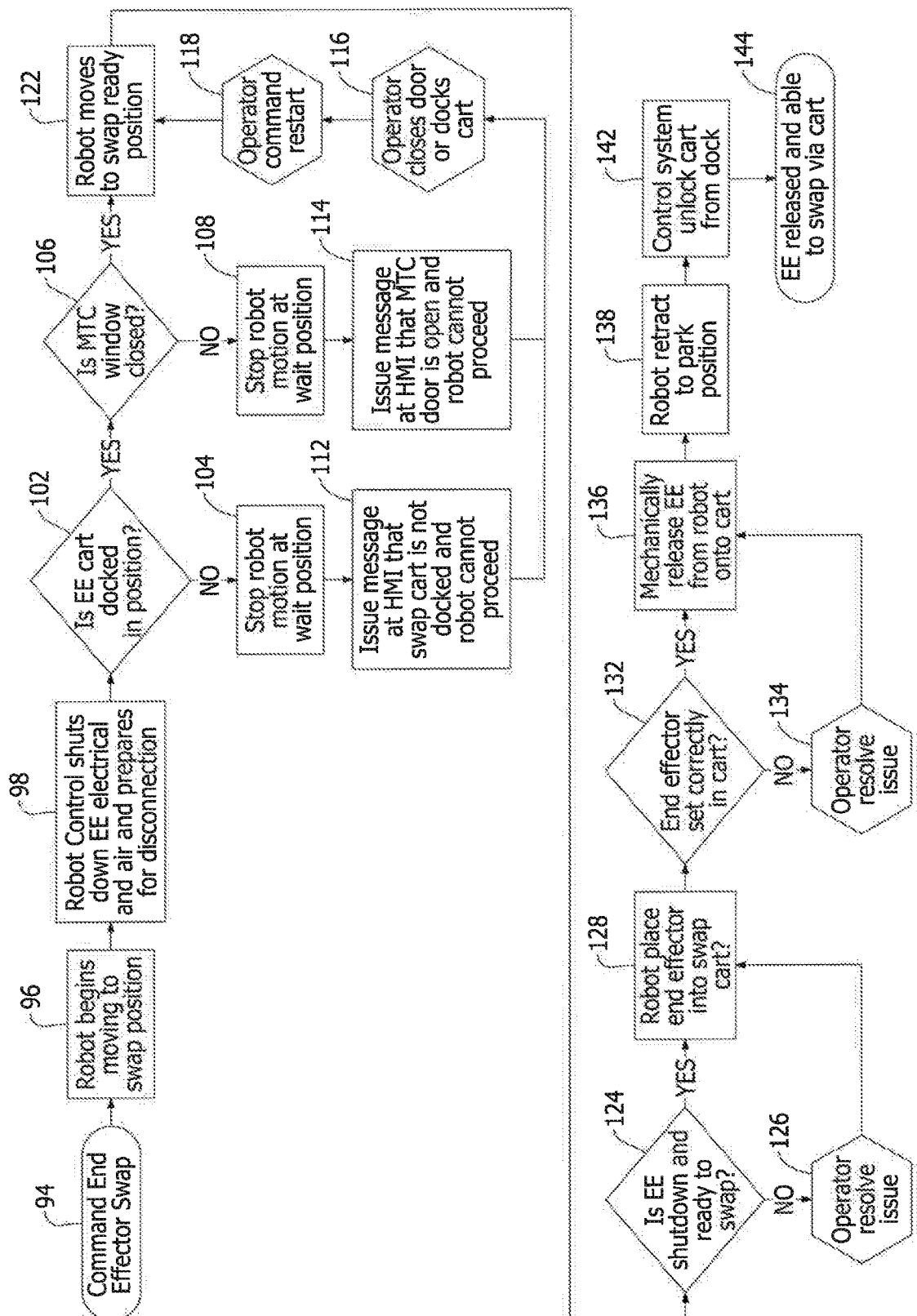
FIG. 9 is a flow chart representing operation of a control system during switching out of a first cart and a second cart of the safety architecture.

FIG. 9 is a flow chart representing the operation of the control system 24 when a first end effector 18 (EE) is replaced by a second end effector 22 (EE). Step 94 represents a command input to the control system 24 by an operator to replace the first end effector 18 with the second end effector 22. At 94 a first robot 14 is controlled by the control system 24 to move to a swap position adjacent the lower portion of the first opening 36. At 98 the first robot 14 is controlled by the control system 24 to shut down the operation of the first end effector 18(EE) and prepare the first end effector 18 for disconnection from the first robot 14. At step 102, the control system 24 checks the position of the first cart 42 to determine if the first cart is positioned properly adjacent the lower portion of the first opening 36. At step 104, if the first cart 42 is not properly positioned, the control system 24 controls the first robot 14 to cease operation and wait for the proper positioning of the first cart 42. At step 106, the control system 24 checks to see if the first upper panel 62 (MTC) is closed. If the first upper panel 62 is not closed, the control system 24 controls the operation of the robot 14 to stop until the first upper panel 62 is closed.

At step 112, the control system 24 issues a message to a human/machine interface (HMI) of the control system 24 notifying the operator that the first cart 42 is not property positioned adjacent the lower portion of the first opening 36. At step 114, the control system 24 issues a (HMI) message to the operator indicating that the first upper panel 62 (MTC) is not in the closed position. At step 116, the operator then manually, properly positions the first cart 42 relative to the lower portion of the first opening 36, and/or closes the first upper panel 62. At step 118, the operator then issues a command to the control system 24 to restart the end effector swap process. At step 122, the robot 14 is moved relative to the lower portion of the first opening 36 where the first robot 14 is ready to swap the first end effector 18 for the second end effector 22.

At step 124, the first end effector 18 (EE) is checked to ensure that it is shut down. At step 126, if the first end effector 18 is not shut down and ready to be swapped for the second end effector 22, the operator resolves the problem preventing the swap. At step 128, if the first end effector 18 is shut down and is ready to be swapped with the second end effector 22, the first robot 14 is controlled by the control system 124 to position the first end effector on the first cart 42.

At step 132, the control system 24 checks to see if the first end effector 18 is properly positioned on the first cart 42. If the first end effector 18 is not property positioned on the first cart 42, the operator resolves the problem at step 134. If the first end effector 18 is properly positioned on the first cart 42, the control system 24 controls the first robot 14 to release the first end effector 18 (EE) onto the top surface 44 of the first cart 42 at step 136. At step 138, the first robot 14 moves away from the lower portion of the first opening 36. At step 142, the control system 24 unlocks the first cart 42 from the lower portion of the first opening 36, and at step 144 the first cart 42 with the removed first end effector 18 (EE) supported on the top surface 44 of the first cart is manually moved out of the lower portion of the first opening 36. With the first cart 42 removed from the lower portion of the first opening 36, the second end effector 22 positioned on the top surface 56 of the second cart 52 can be moved into the now open lower portion of the first opening 36 where the first robot 14 can be operated by the control system 24 to connect to the second end effector 22.

Figure 10:
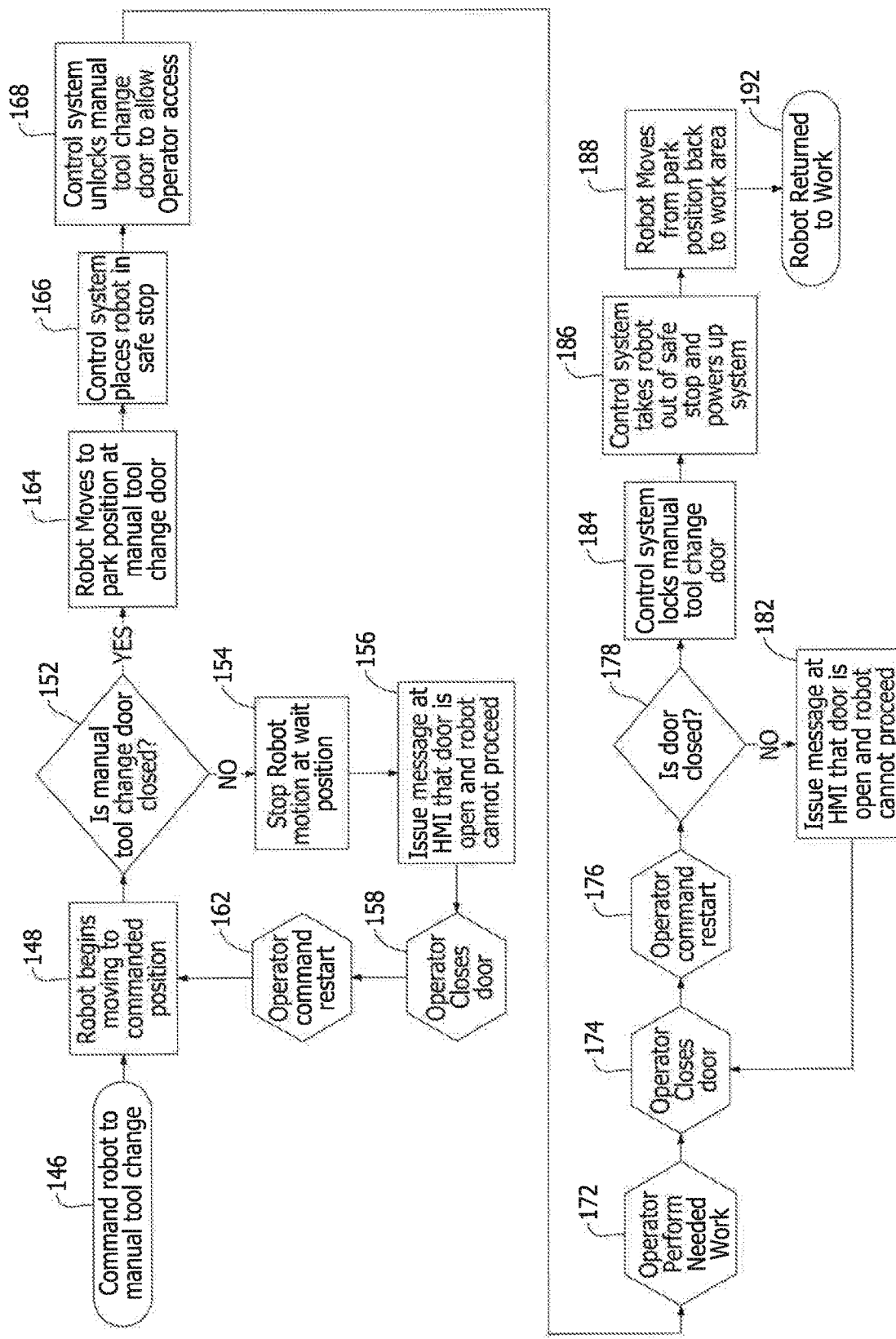
FIG. 10 is a flow chart representing operation of a control system when changing tooling on an end effector of the safety architecture.

FIG. 10 is a flowchart representing the operation of the control system 24 controlling the first robot 14, the first end effector 18 and the first upper panel 62 during a manual tool change on the first end effector 18. At step 146 a command signal is sent by the control system 24 to the robot 14 that a manual tool change of the end effector 18 is to take place. At step 148, the first robot 14 begins to move to a position adjacent the upper portion of the first opening 38. At step 152 the control system 24 checks to ensure that the first upper panel 62 (MTC) over the upper portion of the first opening 38 is closed. At step 154, if the control system 24 determines that the first upper panel 62 is not closed, the control system 24 controls the first robot 14 to stop at a wait position. At step 156, the control system 24 provides a (HMI) signal to the operator indicating that the first upper panel 62 is open and that the first robot 14 cannot proceed with the manual tool change. At step 158, the operator closes the first upper panel 62 and at step 162 the operator controls the control system 24 to restart the movement of the first robot 14. Again, at step 148 the robot 14 begins to move to a position adjacent the upper portion of the first opening 38 and at step 152, the control system 24 again checks to ensure that the first upper panel 62 is closed. With the control system 24 determining that the first upper panel 62 is closed, the first robot 14 moves to a park position with the first end effector 18 positioned adjacent the first upper panel 62. At step 166, the control system 24 places the first robot 14 in a safe stop, and at step 168, the control system 24 unlocks the first upper panel 62 to allow the operator access to the first end effector 18. At step 172, the operator performs the work needed on the first end effector 18 and at step 174 the operator closes the first upper panel 62. At step 176, the operator controls the control system 24 to restart the first robot 14 and at step 178, the control system 24 checks the first upper panel 62 to ensure it is closed. If the control system 24 determines that the first upper panel 62 is not closed, at step 182, the control system 24 issues a (HMI) message notifying the operator that the first upper panel 62 is open and the first robot 14 cannot proceed. If at step 178, the control system 24 determines that the first upper panel 62 is closed, at step 184 the control system 24 locks the first upper panel 62. At step 186, the control system 24 then takes the first robot 14 out of its safe stop and powers up the robot 14. At step 188, the first robot 14 moves from the park position adjacent the upper portion of the first opening 38 and back to the work cell area 32. At step 192, the first robot 14 is controlled by the control system 24 to return to the work cell area 32.

Figure 11:
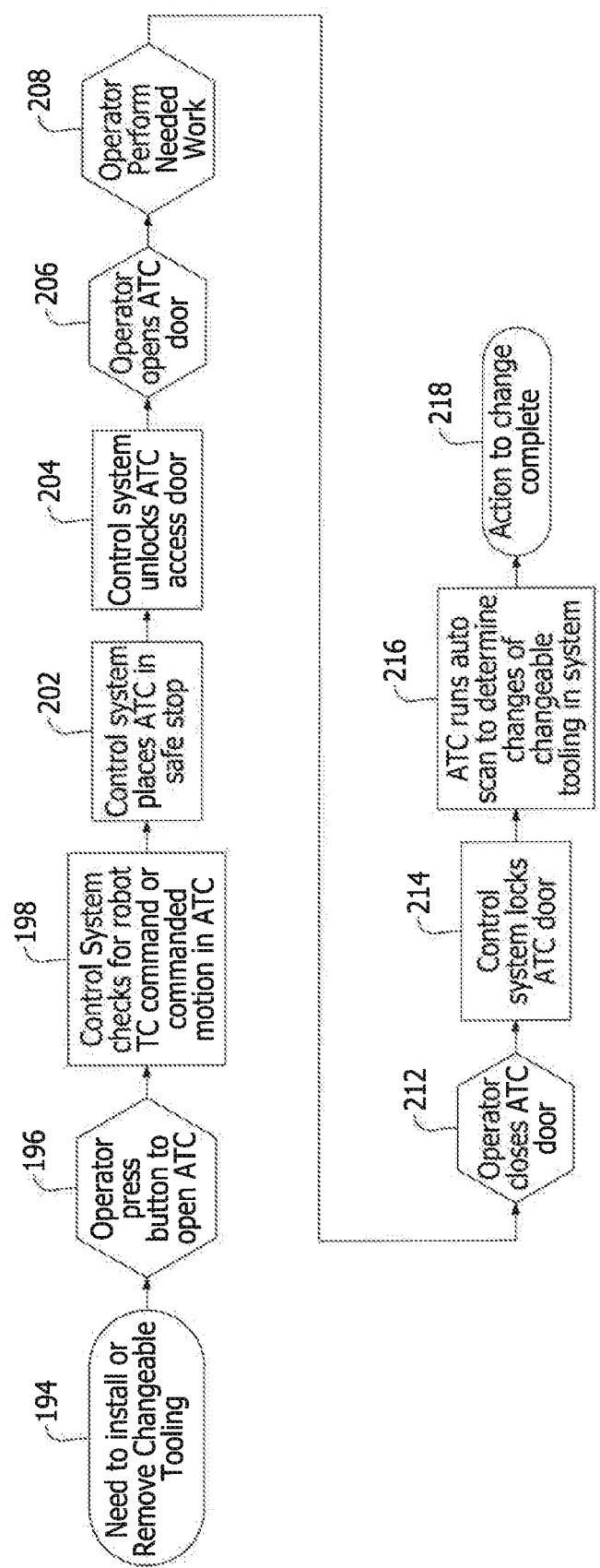
FIG. 11 is a flow chart representing operation of a control system when installing or removing tooling at an automatic tool changer of the safety architecture.

FIG. 11 is a flowchart representing the operation of the control system 24 controlling a tool changer of the safety architecture in installing or removing changeable tooling of the safety architecture. At step 194, the operator observes the automatic tool changer and determines whether there is a need to install or remove changeable tooling that is controlled by the automatic tool changer. At step 196, the operator presses a button to open the automatic tool changer (ATC) if the operator determines that there is a need to install or remove changeable tooling controlled by the automatic tool changer. At step 198, the control system 24 determines if a command has been received from the robot 14 for a tool change on the robot, and checks the automatic tool changer (ATC) to determine if the automatic tool changer is operating to make a tool change. At step 202, the control system 24 places the automatic tool changer (ATC) in a safe stop. At step 204, the control system 24 unlocks the automatic tool changer (ATC) access door, or the tooling panel 66 covering the second opening 64. At step 206, the operator opens the tooling panel 66 (ATC) and at step 208 the operator performs the needed work on the automatic tool changer, either installing or removing changeable tooling on the automatic tool changer. At step 212, the operator closes the tooling panel 66 (ATC). At step 214, the control system 24 locks the tooling panel 66 (ATC) in its closed position. At step 216, the automatic tool changer (ATC) runs an autoscan to determine the changes made to the changeable tooling operated by the automated tool changer. At step 218, the automatic tool changer communicates to the control system 24 that the tooling change is complete.

Figure 12:
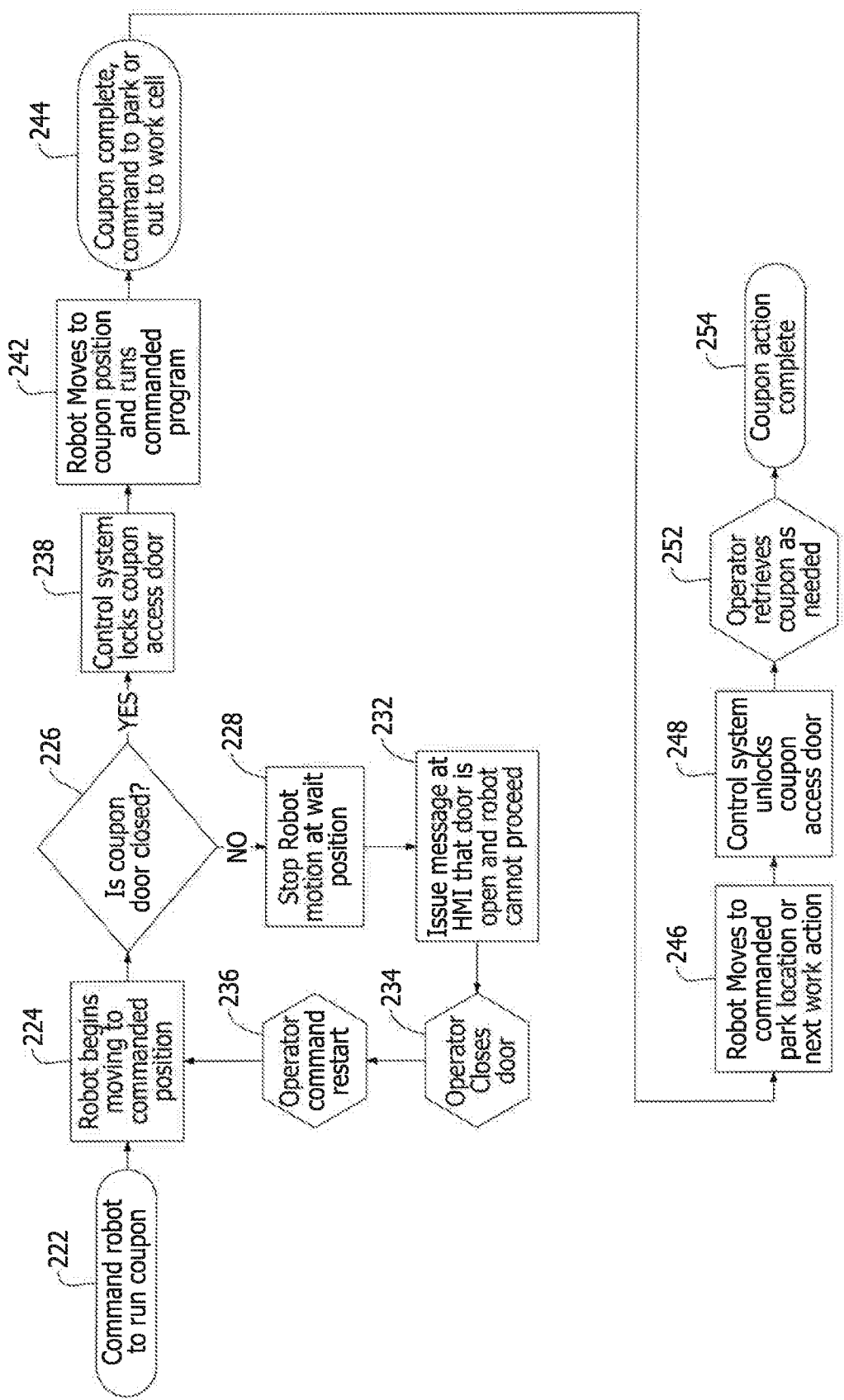
FIG. 12 is a flow chart representing operation of a control system in supplying and removing test coupons of the safety architecture.

FIG. 12 is a flow chart representing the operation of the control system 24 in supplying and removing test coupons of the safety architecture. At step 222, the control system 24 controls the robot 14 to produce a material test coupon for the aircraft component being constructed in the work cell area 32. At step 224, the control system 24 controls the robot 14 to bring the material test coupon to a position adjacent the third opening 72. As the robot 14 moves toward the third opening 72, the control system 24 determines if the third panel 74 is closed at step 226. If the third panel 74 is determined by the control system 24 to not be closed, the control system 24 controls the robot 14 to stop at a wait position at step 228. At step 232, the control system 24 (HMI) notifies the operator that the third panel 74 is open and that the robot 14 has been commanded to stop and not move toward the third opening 72. At step 234, the operator closes the third panel 74 and at step 236, the operator commands the control system 24 to restart the movement of the robot 14. At step 224, the robot 14 again moves toward the third opening 72 and at step 226, the control system 24 again checks to ensure that the third panel 74 is closed. With the control system 24 determining that the third panel 74 is closed, at step 238 the control system 24 locks the third panel 74. At step 242, the robot 14 moves to a position adjacent the third panel 74 and deposits the material test coupon on a coupon holder adjacent the third panel 74. At step 244, with the material test coupon positioned on the coupon holder, the control system 24 then controls the robot 14 to move to a park position, or to move out to the work cell area 32. At step 246, the control system 24 moves the robot 14 to the park location, or to the work cell area 32 to continue the manufacturing operation of the robot 14. At step 248, the control system 24 unlocks the third panel 74. At step 252, the operator opens the third panel 74 and retrieves the material test coupon deposited adjacent the third panel 74. At step 254, the operator communicates to the control system 24 that the material test coupon action has been completed.

As various modifications could be made in the construction of the safety architecture and its method of operation herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. A safety architecture for a machine work cell, the machine work cell having a plurality of automated platforms or positioning machines, the safety architecture comprising:
   a barrier defining a lower opening that (i) passes through the barrier and extends to a bottom of the barrier, and (ii) extends around the plurality of automated platforms or positioning machines to thereby separate a work cell area for the plurality of automated platforms or positioning machines from a personnel area for personnel that maintain the plurality of automated platforms or positioning machines in the work cell area; and
   a cart having a cart panel that extends vertically upward from the cart to close the lower opening through the barrier when the cart is moved from the personnel area into the work cell area through the lower opening.

2. The safety architecture for a machine work cell of claim 1, wherein the cart panel is moveable between a closed position of the cart panel where the cart panel covers over the lower opening and an opened position of the cart panel where the cart panel is displaced from the lower opening.

3. The safety architecture for a machine work cell of claim 2, further comprising:
   a control system programmed to:
      communicate with the plurality of automated platforms or positioning machines in the work cell area and with the cart;
      lock the cart panel in the closed position in response to the control system sensing a functioning one of the automated platforms or positioning machines adjacent the lower opening; and
      unlock the cart panel and enable the cart panel to be moved to the opened position of the cart panel in response to the control system sensing one of the automated platforms or positioning machines that has been: (i) controlled to move to a position adjacent the lower opening and then (ii) controlled to be immobile and non-functioning.

4. The safety architecture for a machine work cell of claim 3,
   wherein the barrier defines a test coupon opening through the barrier, the test coupon opening providing personnel in the personnel area access to a test coupon location in the work cell area.

5. The safety architecture for a machine work cell of claim 1,
   wherein the cart includes a top surface for receiving and supporting an end effector received by the cart from a positioning machine in the work cell area, and wherein the cart panel is secured to the top surface.

6. A safety architecture for a machine work cell comprising:
   a barrier separating a work cell area for positioning machines having end effectors on the positioning machines from a personnel area for personnel that maintain the positioning machines in the work cell area;
   first and second lower openings through the barrier that extend to a bottom of the barrier, and around the plurality of automated platforms or positioning machines;
   first and second upper openings disposed above the first and second lower openings and providing personnel in the personnel area access to an immobile, non-functioning positioning machine connected to an end effector needing replacement in the work cell area and adjacent the first and second upper openings, respectively, while other positioning machines in the work cell area are mobile and functioning;
a first cart moveable from the personnel area through the first lower opening through the barrier and into the work cell area, the first cart having a top surface configured to receive thereon and support the end effector needing replacement and having a first panel extending vertically upward from the top surface to close the first lower opening when the first cart is in the work cell area; and
a second cart having a top surface configured to receive and support a replacement end effector, the second cart being moveable from the personnel area with the replacement end effector through the second lower opening through the barrier and into the work cell area to a position where the positioning machine can connect to the replacement end effector, and the second cart being moveable without the replacement end effector from the work cell area through the second lower opening through the barrier and into the personnel area.

7. The safety architecture for a machine work cell of claim 6, further comprising:
a control system configured to communicate with the positioning machines and control movements and functioning of the positioning machines; and
the control system being operable to move the positioning machine to a position adjacent the first upper opening and then control the positioning machine to be immobile and nonfunctioning.

8. The safety architecture for a machine work cell of claim 6, further comprising:
the first panel being secured to the first cart, the first panel being moveable over the first lower opening to a closed position of the first panel where the first panel covers over the first lower opening in response to the first cart being moved from the personnel area through the first lower opening through the barrier and into the work cell area, and the first panel being moveable to an opened position of the first panel where the first panel is displaced from the first lower opening in response to the first cart being moved from the work cell area through the first lower opening through the barrier and into the personnel area; and,
a second panel secured to the second cart, the second panel extending vertically upward from the second cart, the second panel being moveable over the second lower opening to a closed position of the second panel where the second panel covers over the second lower opening in response to the second cart being moved from the personnel area through the second lower opening through the barrier and into the work cell area, and the second panel being moveable to an opened position of the second panel where the second panel is displaced from the second lower opening in response to the second cart being moved from the work cell area through the second lower opening through the barrier and into the personnel area.

9. The safety architecture for a machine work cell are of claim 8, further comprising:
the control system being programmed to communicate with the positioning machines in the work cell area and with the first panel, the control system being operable to lock the first panel in the closed position of the first panel in the first lower opening through the barrier in response to the control system sensing a mobile and functioning positioning machine adjacent the first lower opening through the barrier, and the control system being operable to unlock the first panel and enable the first panel to be moved to the opened position of the first panel in response to the control system sensing an immobile and nonfunctioning positioning machine adjacent the first lower opening.

10. The safety architecture for a machine work cell of claim 6, further comprising:
the first lower opening being a cart and end effector opening through the barrier; and,
the first upper opening being configured as a tooling opening through the barrier, the tooling opening providing personnel in the personnel area access to a tool changing location in the work cell area.

11. The safety architecture for a machine work cell of claim 10, further comprising:
a test coupon opening through the barrier, the test coupon opening providing personnel in the personnel area access to a test coupon location in the work cell area through the test coupon opening.

12. The safety architecture for a machine work cell of claim 11, further comprising:
a tooling panel over the tooling opening, the tooling panel being moveable between a closed position of the tooling panel where the tooling panel covers over the tooling opening and an opened position of the tooling panel where the tooling panel is displaced from the tooling opening; and
a test panel over the test coupon opening, the test panel being moveable between a closed position of the test panel where the test panel covers over the test coupon opening and an opened position of the test panel where the test panel is displaced from the test coupon opening.

13. A method of accessing an end effector on a positioning machine in a work cell area without ceasing functioning of other end effectors of other positioning machines in the work cell area, the work cell being surrounded by a barrier defining a lower opening that (i) passes through the barrier and extends to a bottom of the barrier, and (ii) extends around the plurality of automated platforms or positioning machines to thereby separate a work cell area from a personnel area, the barrier defining an upper opening disposed above the lower opening, the method comprising:
controlling a first positioning machine to move a first end effector to a position adjacent the first lower opening through the barrier separating the work cell area from the personnel area;
controlling the first positioning machine to hold the first end effector stationary in the position adjacent the first lower opening through the barrier;
controlling the first positioning machine to prevent functioning of the first end effector in the position adjacent the first lower opening through the barrier;
moving a cart through the first lower opening from the personnel area to the work cell area; and
closing the first lower opening using a vertical panel of the cart without ceasing functioning of other end effectors of other positioning machines in the work cell area.

14. The method of claim 13, further comprising:
controlling the first positioning machine to position the first end effector on the first cart that extends through the first lower opening through the barrier;
controlling the first positioning machine to disconnect from the first end effector; and
moving the first cart and the first end effector on the first cart from the work cell area without ceasing operation of the other end effectors of the other positioning machines in the work cell area.

15. The method of claim 14, further comprising:
moving a second cart with a second end effector positioned on the second cart from the personnel area and through a second lower opening through the barrier to position the second cart and the second end effector on the second cart in the work cell area, the second lower opening passing through and extending to a bottom of the barrier;

controlling the first positioning machine to attach to the second end effector supported on the second cart in the work cell area; and, controlling the first positioning machine to move the second end effector attached to the first positioning machine to the work cell area without ceasing functioning of the other end effectors of the other positioning machines in the work cell area.

16. The safety architecture of claim 1, wherein the barrier is constructed of metal mesh or wire screen.

17. The safety architecture of claim 1, wherein the barrier defines an upper opening above the lower opening.

18. The safety architecture of claim 1, wherein the barrier extends completely around the positioning machines in the work cell area.

19. The safety architecture of claim 1, wherein the lower opening is rectangular.

20. The safety architecture for a machine work cell of claim 6, wherein the barrier is constructed of metal mesh or wire screen.

* * * * *